United States Patent [19]

Milne

[11] 4,060,953

[45] Dec. 6, 1977

[54] ARTIFICIAL AND NATURAL STRUCTURES

[75] Inventor: James Milne, Cumberland, England

[73] Assignee: Balfour, Beatty & Company Limited, Croydon, England

[21] Appl. No.: 411,038

[22] Filed: Oct. 30, 1973

[30] Foreign Application Priority Data

Nov. 1, 1972 United Kingdom ............... 50321/72
July 13, 1973 United Kingdom ............... 33559/73

[51] Int. Cl.² ............................................. E02D 37/00
[52] U.S. Cl. ........................................ 52/743; 52/514;
427/294; 427/297; 264/36; 264/102; 425/85;
29/401 A; 29/401 E; 29/402
[58] Field of Search ................. 52/743, 744, 514, 515,
52/516, 517; 117/119, 48; 264/36, 134, 135,
101, 102; 425/85; 29/401 R, 401 A, 401 E, 402

[56] References Cited

U.S. PATENT DOCUMENTS

| 1,814,127 | 7/1931 | Christians | 52/744 |
| 1,953,452 | 4/1934 | Wertz | 264/36 |
| 2,246,028 | 6/1941 | Woodring | 52/744 |
| 2,254,252 | 9/1941 | Wertz | 52/744 |
| 2,276,507 | 3/1942 | Moore | 117/119 |
| 2,417,026 | 3/1947 | Walter | 52/514 |
| 2,689,504 | 7/1954 | Sell | 264/36 |
| 2,867,543 | 1/1959 | Braun | 117/119 |
| 2,903,389 | 9/1959 | Fujita | 117/119 |
| 2,941,905 | 6/1960 | Hofmann | 264/101 |

FOREIGN PATENT DOCUMENTS

| 253,178 | 3/1967 | Austria | 52/743 |
| 1,634,431 | 7/1969 | Germany | 52/744 |
| 607,551 | 9/1948 | United Kingdom | 52/744 |
| 704,610 | 2/1954 | United Kingdom | 117/119 |
| 763,849 | 12/1956 | United Kingdom | 117/119 |
| 996,759 | 6/1965 | United Kingdom | 117/119 |

Primary Examiner—Ernest R. Purser
Assistant Examiner—Henry Raduazo
Attorney, Agent, or Firm—Buell, Blenko & Ziesenheim

[57] ABSTRACT

Voids in an artificial or natural structure are filled with a hardenable material in a liquid or semi-liquid state by surrounding the structure or a part of the structure containing the voids by a closely fitting, fluid-impermeable covering and sealing boundary edges of the covering to the structure to form a substantially fluid-tight enclosure. Air is evacuated from the voids within the fluid-tight enclosure and hardenable material in a liquid or semi-liquid state is allowed to enter into the evacuated voids until the hardenable material appears at the openings of the voids in the surface or surfaces of the structure. The hardenable material is then permitted or caused to set. The covering may be formed wholly or in part by at least one closely fitting, flexible, fluid-impermeable shroud, which is preferably transparent. At least part of the covering may comprise at least one closely fitting, fluid-impermeable coating.

31 Claims, 7 Drawing Figures

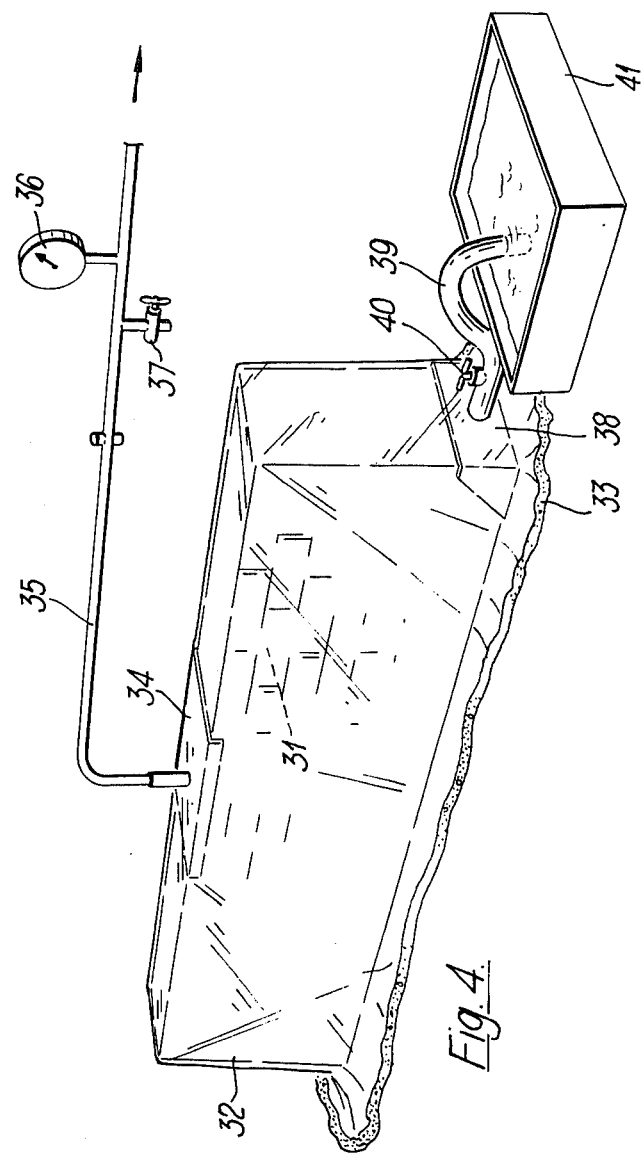

ARTIFICIAL AND NATURAL STRUCTURES

This invention relates to artificial and natural structures built up of or comprising a plurality of separately formed bodies of manufactured or natural material or consisting of a single body of concrete or of rock, granite or other material in its natural state. Structures fabricated from or comprising a plurality of separately formed bodies include the walls of buildings, the abutments and piers of bridges, chimneys, bricklined drains and sewers, retaining walls, foundations, monuments, sculptures, archaeological remains, and other structures built up of or comprising bricks, rocks, stones, granite, timber or other building materials with or without interposed mortar or other hardenable material. Single bodies of concrete or other materials include roads, airfield runways and foundations of heavy machinery. All such artificial and natural structures will, for convenience, hereinafter be referred to as "artificial or natural structures of the kind specified".

Crumbling and similar deterioration of the material or materials of artificial or natural structures of the kind specified can be regarded as the propagation of cracks or other voids in the material that results in a complexity of interconnected fissures. The presence of cracks or other voids in an artificial or natural structure not only lowers its strength but jeopardises the structure further should these cracks or other voids propagate. Cracks and other voids in a structure act as sources of stress and can cause high stress concentrations. Thus, unless a structure having cracks or other voids in it is repaired and/or strengthened, it may only be a question of time before the structure collapses or otherwise fails. The repair and/or strengthening of artificial or natural structures of the kind specified that have suffered damage in the form of cracks, fissures or other voids caused by geological disturbances such as earth tremors, by weathering, by foundation subsidence, by heavy rainfall or flooding, or as a result of warfare or other hostilities is a long existing problem to which no wholly satisfactory solution has yet been found.

It is an object of the present invention to provide an improved method of introducing a hardenable material in a liquid or semi-liquid state into cracks or other voids in an artificial or natural structure of the kind specified which substantially reduces the risk that cracks or other voids within the interior of the structure will not be substantially filled with the hardenable material.

According to the invention the method comprises surrounding the structure or a part of the structure containing the cracks or other voids that are to be filled by a closely fitting, fluid-impermeable covering and sealing boundary edges of the covering to the structure to form a substantially fluid-tight enclosure; evacuating air and any other fluid from the cracks and other voids within the fluid-tight enclosure and, when the cracks and other voids have been substantially evacuated, allowing the hardenable material in a liquid or semi-liquid state to enter into the evacuated cracks or other voids until the hardenable material appears at the openings of the cracks and voids in the surface or surfaces of the structure; and permitting or causing the hardenable material to set.

The closely fitting, fluid-impermeable covering may be formed wholly by a flexible shroud or, in some circumstances where the structure or part of the structure has a surface or surfaces of a shape or configuration that makes it difficult to envelop such surface or surfaces in a closely fitting shroud, for instance where a surface has a structural member or structural members upstanding from or projecting outwardly from the surface, the closely fitting, flexible, fluid-impermeable covering may be formed at least in part by applying to an exposed surface or exposed surfaces of the structure or part of the structure a continuous layer of hardenable material in a liquid or semi-liquid state which, on setting, forms a closely fitting, fluid-impermeable coating.

Where the closely fitting, fluid-impermeable covering consists of or comprises a flexible shroud, in order that progress of the filling operation can be observed at all times and that the supply of hardenable material can be cut off as soon as hardenable material appears at the openings of the cracks and voids in the surface or surfaces of the structure, the shroud is preferably formed of a transparent material.

Boundary edges of the flexible shroud are preferably sealed to the structure by means of a coating of resin or other hardenable material; alternatively an adhesive tape may be employed, any tendency for leakage between the tape and the underlying part of the structure being substantially reduced automatically when the substantially fluid-tight enclosure is evacuated and the boundary edges of the shroud are sucked down on to the structure. Where a part of the external surface of a structure to which a boundary edge of a shroud is to be sealed is very uneven or is of a porous nature, preferably the unevenness and/or porosity of that part of the surface is substantially reduced by application of a coating of cement or other suitable hardenable material in a liquid or semi-liquid state, the hardenable material being permitted or caused to set before the shroud is applied. If, despite continued evacuation of the enclosure, it is impossible to create a substantial vacuum within the shroud, thereby indicating that leakage is taking place at at least one location around the boundary edges of the shroud, a coating of hardenable material in a liquid or semi-liquid state may be applied over boundary edges of the shroud and/or sealing tape while the enclosure is being evacuated, this coating being permitted or caused to set before hardenable material is caused to enter the cracks and other voids.

Where the closely fitting, fluid-impermeable covering consists of or comprises a coating of hardened material, the hardenable material that is to be applied to a surface or surfaces of the structure or part of the structure to form said coating is preferably sprayed or painted on to the surface or surfaces and is preferably of such a nature that, on setting, it will form a coating that is substantially transparent.

The fluid-tight enclosure may be formed in part by at least one closely fitting, flexible, fluid-impermeable shroud and in part by one or more than one closely fitting fluid-impermeable coating which is preferably substantially transparent, and in this case an outlet or outlets for connection to means for evacuating the enclosure will be provided in an upper part of the shroud. Where the fluid-tight enclosure is formed wholly by a closely fitting, fluid-impermeable coating, preferably at least one outlet to which means for evacuating the enclosure can be connected is connected to the cracks or other voids within the structure at an upper part of the structure before the layer of hardenable material is applied, the layer being permitted or caused to set before the cracks or other voids within the structure or part of the structure are evacuated and hardenable material in a liquid or semi-liquid state is caused to enter them.

Where groups of cracks or other voids that are visible in a surface of the structure are isolated one group from another, preferably grooves or other depressions are cut in the surface of the structure to interconnect all visible cracks and other voids.

The hardenable material that is to fill the cracks or other voids and that may be used to form a closely fitting coating on an exposed surface or exposed surfaces of a structure is preferably a material that, when it sets, will adhere strongly to the boundary surfaces of the cracks or other voids and to said exposed surface or surfaces. It preferably comprises a compound of which a major proportion is a synthetic resin, for instance a polyester resin or an epoxy resin, to which fiberglass or other suitable reinforcing material may be added and whose colour may be modified by the incorporation of a chemically inert dye.

An important advantage arising from the method of the present invention lies in the fact that dehydration of the structure or part of the structure surrounded by the substantially fluid-tight enclosure takes place as the pressure within the enclosure decreases and consequently, if evacuation is effected to a sufficient extent and for a sufficient time, substantially all moisture can be removed from the structure. The method of the invention is, therefore, eminently suitable for repairing or fabricating damp courses in artificial or natural structures of the kind specified. Quite apart from the fact that the method can be so effected that substantially no moisture will be trapped in cracks or other voids with the advantage that risk of crumbling or other deterioration due to freezing and thawing of trapped moisture caused by large changes in environmental temperature is substantially reduced, dust, dirt and other loose particles that may be present in the cracks or other voids can be flushed out with water or other fluid under pressure, either before or after applying the covering to the structure, because the structure can be substantially dehydrated when the enclosure is evacuated and before the hardenable material is drawn into the voids. Furthermore, since substantially all trace of dampness will be removed from the structure or part of the structure before the hardenable material is drawn into the enclosure, polyester resins which cannot be used where there is the slightest trace of dampness because of their poor adhesion in such conditions, can be used in the method of the present invention with the knowledge that a good bond between the polyester resin and the boundary surfaces of the cracks or other voids is ensured. The acceptable use of polyester resins in the method of the present invention is especially important because they are substantially cheaper than epoxy resins.

One important application of the method of the present invention that arises from the fact that substantial dehydration of the structure or part of the structure surrounded by the substantially fluid-tight enclosure can be caused to take place lies in the use of the method to point brick or stone walls. Dampness leads to decay and much harm can be caused to pointing by dampness, especially where the pointing is over-hard. Over-hard pointing tends to trap moisture along the boundaries of the joints, bringing any harmful salts to the surface where they crystallise and may damage the facing of the wall. Pointing of a brick or stone wall by the method of the present invention not only provides a substantially waterproof seal along the boundaries of the joints but also tends to impregnate with hardenable material porous mortar deep inside the joints, thereby providing protection against further damp and decay.

The method of the invention can also be employed to provide weather protection for the facing of structures of porous material, such as brick, concrete, sandstone, limestone and marble, the porous material being impregnated to any desired depth with a water-resistant resin or other water-resistant hardenable material. Where the structure is a sculpture or statue of marble, sandstone, limestone or other porous material, any risk of surface discolouration due to impregnation of resin or other hardenable material may be avoided by washing the resin or other hardenable material from the facing of the structure with a suitable solvent between the gelation and hardening phases of the hardenable material.

Where the hardenable material employed is a material which will set more rapidly when heated, at least one electrically continuous elongate electric conductor may be arranged in at least some of the cracks or other voids in the structure or part of the structure before the substantially fluid-tight enclosure is formed, the ends of the conductor being arranged to protrude through fluid-tight seals in the wall of the enclosure for connection to a source of electrical supply and, after the hardenable material has entered the evacuated cracks and other voids, an electric current is caused to flow through the or each conductor sufficient to heat the conductor and the hardenable material in which it is embedded and thereby assist in setting of the hardenable material.

The or each electrically continuous elongate electric conductor may comprise a single length of wire, strand or other elongate member of electrically conductive metal or metal alloy or it may be built up of two or more lengths of wire, strand or other elongate metal member connected end to end. In the latter case the ends of some or all of the lengths of wire, strand or other elongate metal member may protrude from the structure and be electrically connected together outside the structure.

In addition to reducing the time necessary for the hardenable material to set, the part of the or each wire, strand or other elongate metallic member which remains embedded in the structure or part of the structure after its projecting ends have been removed serves to reinforce the hardenable material in the cracks or other voids. With this view in mind the or each wire, strand or other elongate metallic member is preferably arranged to extend through at least the larger cracks or voids in the structure.

Evacuation of the closely fitting, fluid-impermeable covering is preferably effected by at least one vacuum pump and/or at least one air compressor and associated venturi suction ejector. Preferably the or each vacuum pump or air compressor and associated venturi suction ejector is connected to an outlet or outlets in an upper part of the covering and at least one source of hardenable material in a liquid or semi-liquid state is connected to an inlet or inlets at a lower part of the covering so that the hardenable material flows upwardly through the cracks or other voids in the structure or part of the structure surrounded by the substantially fluid-tight enclosure. In this case the or each vacuum pump or air compressor is maintained in operation until hardenable material appears at the or each outlet and has commenced to set. Where the covering consists of or comprises a flexible shroud the source of hardenable material in a liquid or semi-liquid state will be located at a position substantially below the lowermost boundary edge of the shroud to ensure that the shroud is sucked down on to the structure and to reduce the risk that the seal at the lowermost edge may be broken should flexing of a pipe extending between the or each inlet and the source occur.

For structures where a total vacuum is not required, or as a first stage of a two-stage process, it is preferred to employ an air compressor and associated venturi suction ejector because the compressor is cheap to run and sufficiently robust to survive rough treatment on site. Moreover, fouling of the venturi by fumes from the hardenable material or delay in cutoff of the supply of hardenable material is of no consequence as the venturi can easily be washed out. Where a total vacuum is required, or as the second stage of a two-stage process, a vacuum pump is preferred and in this case we prefer to provide, between the structure and the vacuum pump, a fume trap for trapping fumes from the hardenable material that might otherwise damage the pump.

In the case of a structure that is substantially higher than the head of liquefied hardenable material that the vacuum pump or pumps or other means for evacuating air from the enclosure can support, such as for instance might be the case where the structure is a pier of a bridge, the structure may be treated in two or more sections located one above the other, the hardenable material introduced in one section being permitted or caused to set before work on the next section is carried out. Where a section of a structure to be treated is adjacent or extends below ground level, the lower boundary edge of the shroud or coating is preferably substantially sealed to the ground at or near the foot of the structure.

In some cases it may be necessary to render porous earth bearing against a face of the structure and/or porous ground in the vicinity of the foot of the structure impervious by saturating it with cement, pulverised fuel ash, or other hardenable material. Alternatively, in the case of a retaining wall or bridge abutment backed by porous earth, a supplementary exhaust unit of high power and capacity may be employed to draw off leaking air, thereby by-passing the part of the structure being treated.

The method of the present invention is applicable to structures submerged wholly or in part in water and in this case the enclosure would be fitted both with a water pump for removing the water from within the enclosure and with a vacuum pump or other means for evacuating air from the enclosure, the water pump preferably being arranged to operate automatically when the leakage water level in a sump associated with the enclosure reaches a predetermined level. Where the structure is wholly or partly submerged in water, in some circumstances it is preferable to connect the vacuum pump or other means for evacuating air to a lowermost part of the fluid-tight enclosure and to transfer the vacuum pump or other means for evacuating air to an upper part of the structure after the enclosure has been substantially evacuated, the hardenable material then being drawn upwardly into the enclosure.

The method of the present invention may also be employed in circumstances in which, by virtue of the fact that the cracks or voids that require filling with hardenable material are themselves wholly or partly sealed from the atmosphere, a specially applied closely fitting covering need not be arranged to overlie such voids; for instance, in cases where a crack or other void underlies a flexible membrane installed for other purposes, such as to act as a damp-proof barrier, or where cavities left during the construction of a concrete member have not been adequately grouted and remedial action is necessary. In such circumstances it may be necessary to drill two holes into the structure to interconnect with such voids, one for exhaust of air and one for injection of the hardenable material, or to drill one hole into the structure to interconnect with such voids to serve for either of these purposes.

The invention will be further illustrated by a description, by way of example, of alternative methods of restoring cracked and/or crumbling brickwork of a pier of a bridge and of alternative methods of fabricating a structure built up of a plurality of preformed bodies, with reference to the accompanying drawings, in which:

FIG. 4 is a diagrammatic perspective view of a brick wall that is to be fabricated by a third method of the present invention;

Figure 1:
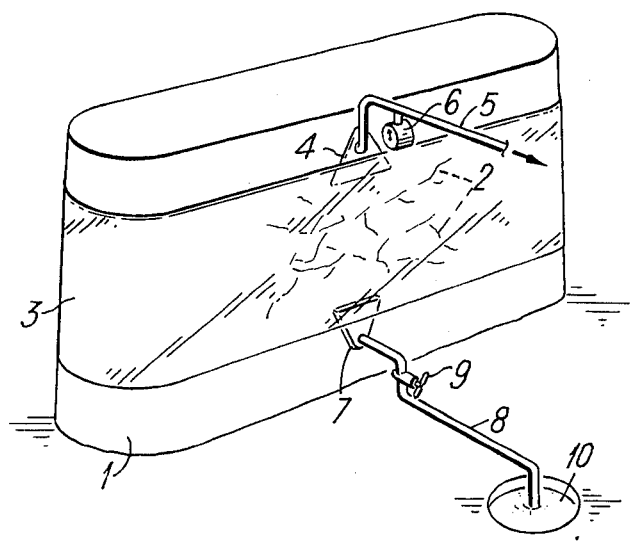
FIG. 1 is a diagrammatic perspective view of a bridge pier that is to be restored by a first method of the invention.
Figure 2:
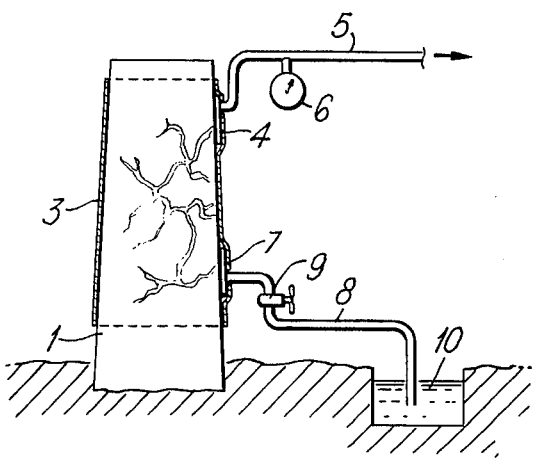
FIG. 2 is a sectional end view of the pier shown in FIG. 1.

Referring to FIGS. 1 and 2, in a first method of restoring the brickwork of a bridge pier 1 that has become badly cracked and crumbly, the cracked and crumbly portion of the pier is first flushed with water under pressure to remove dust, dirt and other loose particles from the cracks 2 and the cracked portion of the pier is then enveloped in a shroud 3 of transparent polythene, the edges of the shroud being sealed to the pier by resin or other adhesive. Attached to and projecting from an upper part of the shroud 3 is an outlet fitting 4 to which is attached a pipe 5, for connection to a vacuum pump or air compressor/venturi arrangement (not shown). A vacuum gauge 6 is connected in the pipe 5 a short distance from the outlet fitting 4. An inlet fitting 7 is attached to and projects outwardly from a lower part of the shroud 3 and this fitting is connected to a source 10 of liquefied grout by a pipe 8. A tap 9 is provided in the pipe 8.

In operation, the tap 9 is closed and air is evacuated from the substantially fluid-tight enclosure formed by the shroud 3 and from the cracks 2, rapid dehydration of the brickwork of the pier taking place as the degree of vacuum within the enclosure increases. When a satisfactory level of vacuum has been reached the evacuated enclosure is allowed to stand for two or three hours to ensure that the brickwork is fully dried out and the tap 9 is then opened and grout is drawn upwardly into the enclosure to fill the cracks until grout appears at the openings of the cracks in the surface or surfaces of the pier and at the outlet 4. At this juncture the tap 9 is closed and the vacuum pump is maintained in operation until hardening of the grout takes place. After the grout has hardened the vacuum pump is switched off and the shroud and associated equipment are removed from the pier. The cracks 2 are now completely filled with hardened grout which is bonded securely to the surfaces of the cracks.

Where the cracked and/or crumbly brickwork of a bridge pier is of such a height that restoration of the brickwork throughout the height of the pier in a single operation is impracticable, the cracked brickwork would be restored in sections, for example in several sections each about 15 feet in height, the lowermost section being restored first and each overlying section then being restored in turn. This procedure would not involve movement of the outlet 4 but would merely incur raising the inlet 7 a distance substantially equal to the height of a section each time.

Where there is a risk that air may leak into the section of the pier under repair from an underlying part of the pier, thereby in some circumstances causing bubbles of air to be formed in the grout as it sets, the vacuum impregnation of the voids in the fluid-tight enclosure is preferably effected in two or more stages. For instance, in a first stage sufficient grout is drawn into the enclosure to fill voids in the lower 15 – 20 cms of the section of the pier under repair and this is allowed to set to form a seal at the base of the section. The main vacuum impregnation operation is then carried out with substantially no risk of air leaking into the section of the pier under repair from a lower part of the pier. Alternatively, to overcome the same problem the vacuum impregnation process may be carried out in a single operation by, first, drawing the grout into the section of the pier under repair under a very high degree of vacuum and, during the period when the grout is setting, reducing the degree of vacuum to a level sufficient only to hold the shroud in position.

Figure 3:
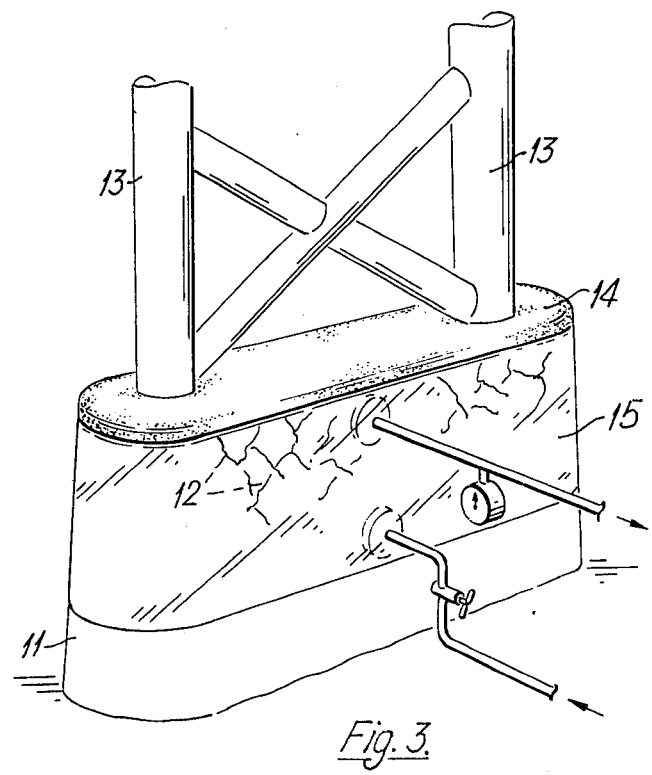
FIG. 3 is a diagrammatic perspective view of a second bridge pier that is to be restored by a second method of the invention.

The bridge pier 11 shown in FIG. 3 has cracks 12 in its brickwork which open into both the uppermost surface and side faces of the pier and has upstanding from this uppermost surface structural members 13. The structural members 13 make it difficult to envelop the upper surface in a flexible shroud. In the method of restoring this pier a coating 14 of synthetic resin is sprayed or painted over the whole of the upper surface of the pier to seal the cracks 12 opening into that surface. After the coating 14 has set a shroud 15 is applied about the pier with the upper edge of the shroud adjacent the upper edge of the pier, the edges of the shroud are sealed to the surfaces of the pier, and the brickwork is then restored by the method as described with reference to FIGS. 1 and 2.

Where the pier shown in FIGS. 1 and 2 or in FIG. 3 has a bank of porous earth bearing against a wall of the pier before the closely fitting covering is evacuated it may be necessary to render the earth in the vicinity of the pier impervious by saturating it with cement, pulverised fuel ash, or other hardenable material.

In fabricating a brick wall 31 by the method as illustrated in FIG. 4, the wall is built up from a plurality of bricks with the bricks spaced an appropriate distance apart by means of separately formed spacers (not shown) interposed between adjacent bricks or by means of spacers (not shown) integral with the bricks themselves. The dry brick wall 31 so formed is completely enveloped in a shroud 32 of transparent polythene, the lowermost edge of the shroud being sealed to the ground by applying hardenable material 33 over the edge of the shroud, the hardenable material on setting bonding to the ground. In the upper part of the shroud 32 is an outlet fitting 34 to which is connected a pipe 35 for connection to a vacuum pump or air compressor/venturi arrangement (not shown), a vacuum gauge 36 and a valve 37 being connected in the pipe. At a lower portion of the shroud 32 at one end of the wall an inlet fitting 38 is connected to a well 41 by a pipe 39, a tap 40 being provided in the pipe.

After the hardenable material 33 has set to seal the shroud 32 to the ground, the tap 40 is closed and the vacuum pump or air compressor/venturi arrangement is brought into operation to evacuate the substantially fluid-tight enclosure formed by the shroud and to withdraw air from the spaces between the bricks. After the vacuum gauge 36 indicates an appropriate suction head, say greater than 26 feet of water, the tap 40 is opened and polyester resin in a liquefied state is drawn through the pipe 39 into the fluid-tight enclosure to fill the spaces between the bricks. When the level of polyester resin is observed through the transparent polythene shroud 32 to have reached the outlet fitting 34, the tap 40 is closed. Full suction head is maintained for three or four minutes and is then gradually reduced when it is observed that hardening of the resin has started to occur. The vacuum pump or air compressor may be shut off after gelation has occurred, normally after 25 to 30 minutes. The polythene sheet is then removed. The spaces between the bricks are now completely filled with hardened polyester resin which is bonded securely to the faces of the bricks bounding the spaces; cracks, fissures and porous areas in the bricks themselves are also completely filled with hardened polyester resin.

The efficiency of the method of the invention in completely filling spaces and voids in a dry brick wall is such that the spacers referred to in the dry brick wall described with reference to FIG. 4 can be omitted and the wall be built up by assembling the bricks without such spacers, imperfections and irregularities in the abutting faces of the bricks providing spaces for filling with hardenable material which, on setting, adheres to the bricks and bonds them together.

Where the spaces or voids within a structure are to be filled with a synthetic resin or other hardenable material of high viscosity and high surface tension, in some circumstances there may be a tendency for the resin to flow directly from the inlet fitting to the outlet fitting, thereby by-passing the more remote voids in the structure surrounded by the enclosure. If such a difficulty should arise, for instance when fabricating the wall shown in FIG. 4, the valve 37 is preferably opened and closed to cause a pulsating vacuum to be applied whilst the resin is being drawn into the enclosure. Opening and closing of the valve 37 may be effected by hand or it may be effected automatically at a frequency, say, of about 12 pulsations per minute over a range of vacuum of, say, 3 to 10 meters head of water. Alternatively, during the vacuum impregnation process, the degree of vacuum may first be maintained as low as possible consistent with smooth introduction of the resin. When impregnation is almost complete, the degree of vacuum is raised to a very high level to remove any air bubbles that may remain due to the initial low level of vacuum and, on completion of impregnation, the degree of vacuum is reduced to an extent sufficient only to hold the shroud 32 in position and prevent weeping away of the resin before it starts to set.

Figure 5:
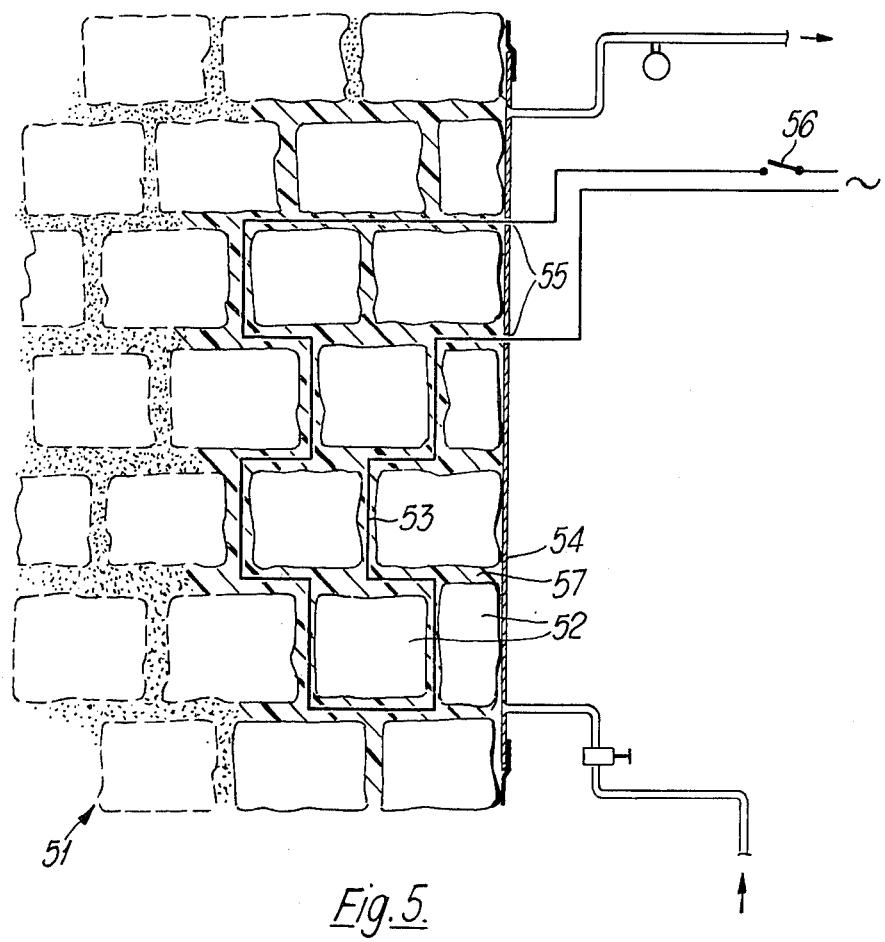
FIG. 5 is a fragmental diagrammatic perspective view of an archaeological ruin built of preformed stone blocks that is to be restored and reinforced by a fourth method of the present invention.

FIG. 5 shows a fragmental sectional view of an archaeological ruin 51 built up of a plurality of preformed stone blocks 52. In repairing a portion of the ruin, stone blocks that have broken into two or more parts or that have become badly cracked are removed from the ruin and are replaced by new stone blocks 52 that are arranged with spaces between them by means of appropriate spacers (not shown). As the new blocks 52 are assembled a length of wire 53 is arranged to extend sinuously through some of the spaces between the blocks with the ends of the wire projecting from a surface of the ruin. The renovated portion of the ruin is now enclosed in a shroud 54 with the ends of the wire 53 protruding through fluid-tight seals 55 in the shroud and the edges of the shroud are sealed to the ruin by resin or other adhesive. The protruding ends of the wire 53 are connected through a switch 56 to a source of electrical power (not shown). The substantially fluid-tight enclosure formed by the shroud 54 is now evacuated, as in the method described with reference to FIGS. 1 and 2 and, when the required degree of vacuum has been obtained, grout 57 is drawn into the enclosure to fill the spaces between the blocks 52. After impregnation is complete, the switch 56 is closed to cause an electric current to flow through the wire 53 sufficient to heat the grout in which it is embedded and expedite setting of the grout. When the grout 57 has set the shroud 54 and associated equipment are removed and the protruding ends of the wire 53 are cut flush with the surface of the ruin. The length of wire 53 embedded in the hardened grout 57 serves to reinforce the renovated part of the ruin.

Figure 6:
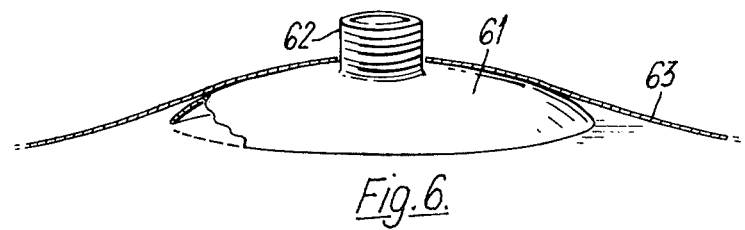
FIGS. 6 and 7 are side elevations of two forms of outlet and inlet fitting for use with a shroud that is to form at least a part of a substantially fluid-tight enclosure.
Figure 7:
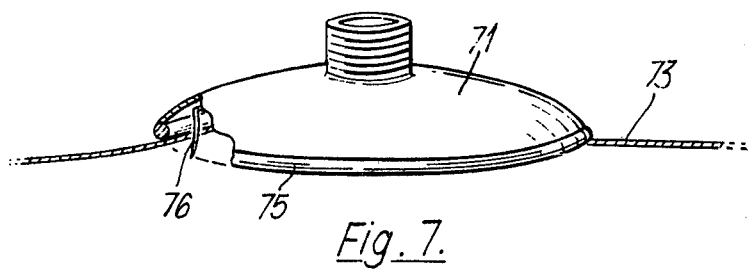

The adaptors shown in FIGS. 6 and 7 may each be used as an inlet fitting of a shroud. The adaptor shown in FIG. 6 comprises an inverted saucer-shaped body 61 of plastics material having a short tubular neck 62 which may be passed through a hole in the shroud 63 for connection to a pipe, the edges of the adaptor being sealed to the shroud by adhesive tape or other suitable means.

The adaptor shown in FIG. 7 is designed for use when it is desired to provide an inlet fitting at a position on a shroud overlying a part of a structure where there may be voids in the structure so remote that they may not become fully filled with hardenable material. The adaptor is of similar form to that shown in FIG. 6 except that it has a soft rubber ring 75 of U-shaped cross-section extending around the periphery of the inverted saucer-shaped body 71 and has, secured to the radially inner edge of the ring, a cutter 76. When the adaptor is to be used it is placed over a part of the shroud 73 where an inlet fitting is required and is rotated to a sufficient extent to cause the cutter 76 to puncture the shroud. The vacuum existing within the shroud holds the adaptor against the punctured part of the shroud with the ring 75 making an effective fluid-tight seal and the adaptor may then be connected by a pipe to a source of liquefied hardenable material.

In each case the pipe by which the adaptor is connected to a source of hardenable material is preferably a flexible, collapsible tube because, under vacuum, such a pipe will collapse and seal the adaptor. When it is desired to introduce liquefied hardenable material into the tube a sufficient head of hardenable material is provided so that the hardenable material will break the seal and will be immediately drawn into the enclosure. When the source of hardenable material has been drained or is cut off, the tube will automatically collapse and again form a fluid-tight seal.

The adaptors shown in FIGS. 6 and 7 may be modified for use as outlet fittings by providing beneath each inverted saucer-shaped body a substantially rigid, perforated tube which prevents the adaptor from collapsing when a vacuum is created within the enclosure.

The method of the present invention has several important advantages that are not provided by any other known method of introducing a hardenable material in a liquefied or semi-liquefied state into cracks or other voids in an artificial or natural structure of the kind specified. By virtue of the fact that the cracks or other voids are evacuated before the hardenable material is introduced, moisture or dampness present in the voids or in the material of the structure bounding the voids can be removed, thereby substantially reducing the risk that entrapped moisture may cause degradation of the structure in the event of freezing/thawing temperature cycles. Since air and other fluid is drawn from the cracks or other voids when the structure or part of the structure surrounded by the substantially fluid-tight enclosure is evacuated, the vacuum impregnating technique has no tendency to extend the cracks or voids but, on the contrary, tends to draw together the surfaces bounding voids in a crumbling structure as the hardenable material is being introduced. Furthermore, there is substantially no risk of air pockets remaining in the structure as substantially all air and other fluid is removed before the hardenable material is introduced. There is also substantially no risk of undetected leakage of liquefied hardenable material through cracks opening into unsupervised surfaces, since the presence of such openings would be detected as a source of air leakage during evacuation of the enclosure. In the case of cracks of small dimension that open into unsupervised surfaces and permit undetected leakage, such leakage will be negligible because the vacuum created tends to close rather than dilate the small cracks and because there will be no continuous trickle of liquefied hardenable material to wash away material of the structure and so enlarge the cracks. Substantially all cracks and other voids in a structure that is being repaired or fabricated, including micro-cracks and other voids of very small dimensions, will be filled with hardenable material which, on setting, will adhere strongly to surfaces of the structure that bound the cracks and other voids.

What I claim as my invention is:

1. A method of strengthening artificial and natural structures having voids therein by introducing a hardenable material in a liquid or semi-liquid state into said voids in the structure, at least some of which voids have openings in at least one surface of the structure, which method comprises surrounding at least a part of the structure containing the voids that are to be filled by a closely fitting, flexible, fluid-impermeable shroud and sealing boundary edges of the shroud to the structure to form a substantially fluid-tight enclosure; evacuating air and any other fluid from the voids within the fluid-tight enclosure and, when the voids have been substantially evacuated, allowing the hardenable material in a liquid or semi-liquid state to enter into the evacuated voids until the hardenable material appears at said openings of voids in the surface or surfaces of the structure and allowing the hardenable material to set.

2. A method as claimed in claim 1, wherein the shroud is removed after the hardenable material has set.

3. A method as claimed in claim 1, wherein the shroud is of a transparent material.

4. A method as claimed in claim 1, wherein a coating of hardenable material is applied over boundary edges of the flexible shroud to seal them to the structure.

5. A method as claimed in claim 1, in which a part of the external surface of a structure to which a boundary edge of the shroud is to be sealed is uneven or is of a porous nature, wherein a coating of hardenable material in a liquid or semi-liquid state is applied to said part of the external surface and is allowed to set before the shroud is applied.

6. A method of strengthening artificial and natural structures having voids therein by introducing hardenable material in a liquid or semi-liquid state into said voids in the structure, at least some of which voids have openings in at least one surface of the structure, which method comprises surrounding at least a part of the structure containing the voids that are to be filled by a closely fitting, fluid-impermeable covering and sealing boundary edges of the covering to the structure to form a substantially fluid-tight enclosure; evacuating air and any other fluid from the voids within the fluid-tight enclosure and, when the voids have been substantially evacuated, allowing the hardenable material in a liquid or semi-liquid state to enter into the evacuated voids until the hardenable material appears at said openings of voids in the surface or surfaces of the structure and allowing the hardenable material to set.

7. A method as claimed in claim 6, in which groups of voids that have openings in a surface of the structure are isolated one group from another, wherein depressions are cut in the surface of the structure to interconnect all said openings.

8. A method as claimed in claim 6, wherein at least one outlet for connection to means for evacuating the enclosure is provided in an upper part of the covering and at least one inlet for connection to a source of hardenable material in a liquid or semi-liquid state is provided in a lower part of the covering.

9. A method as claimed in claim 6, in which the part of the structure surrounded by the substantially fluid-tight enclosure contains moisture, wherein evacuation of the voids in the structure is effected to such an extent and for such a time that said part of the structure is substantially dehydrated before hardenable material is caused to enter the voids.

10. A method as claimed in claim 6, wherein loose particles that may be present in the voids are flushed out with fluid under pressure before the voids are evacuated and evacuation of the voids in the structure is effected to such an extent and for a such a time that said part of the structure surrounded by the substantially fluid-tight enclosure is substantially dehydrated before hardenable material is caused to enter the voids.

11. A method as claimed in claim 6, in which the hardenable material employed is a material which will set more rapidly when heated, wherein at least one electrically continuous elongate electric conductor is arranged in at least some of the voids in said part of the structure before the substantially fluid-tight enclosure is formed, the ends of the conductor being arranged to protrude through fluid-tight seals in the walls of the enclosure for connection to a source of electrical supply and, after the hardenable material has entered the evacuated voids, an electric current is caused to flow through the or each conductor sufficient to heat the conductor and the hardenable material in which it is embedded and thereby assist in setting of the hardenable material.

12. A method as claimed in claim 6, wherein the substantially fluid-tight enclosure is at least partially evacuated by at least one air compressor with which is associated a venturi suction ejector.

13. A method as claimed in claim 12, wherein the substantially fluid-tight enclosure is initially partially evacuated by at least one air compressor and is subsequently substantially wholly evacuated by at least one vacuum pump.

14. A method as claimed in claim 6, in which part of the structure is substantially higher than a head of liquefied hardenable material that the means for evacuating air from a substantially fluid-tight enclosure can support, wherein said part of the structure is treated in at least two sections located one above the other, the hardenable material introduced into one section being allowed to set before work on the next section is carried out.

15. A method as claimed in claim 6, wherein, whilst hardenable material is being drawn into the substantially fluid-tight enclosure, the enclosure is subjected to a pulsating vacuum.

16. A method as claimed in claim 6, wherein, whilst hardenable material is being drawn into the substantially fluid-tight enclosure, the degree of vacuum is maintained as low as possible until all voids are substantially filled with hardenable material, the degree of vacuum is then raised to a level sufficient to remove any air bubbles and, on completion of the filling process, the degree of vacuum is reduced to an extent sufficient to prevent escape of hardenable material before it starts to set.

17. A method as claimed in claim 6, in which a void in said part of the structure is at least partly sealed within the structure from the atmosphere, wherein at least one hole is formed in the structure to connect the void to the atmosphere.

18. A method as claimed in claim 17, wherein two holes are formed in the structure, each connecting the void to the atmosphere, one hole for exhaust of air and the other for injection of hardenable material.

19. A method as claimed in claim 6, in which voids in said part of the structure are at least partly sealed within the structure from the atmosphere, wherein at least one hole is formed in the structure to interconnect said voids and connect them to the atmosphere.

20. A method as claimed in claim 6, in which earth bearing against a face of said part of the structure is porous, wherein said porous earth is saturated with hardenable material in a liquid or semi-liquid state to render it substantially impervious.

21. A method as claimed in claim 6, in which the structure is supported on the ground and ground in the vicinity of that part of the structure in contact with the ground is porous, wherein said porous ground is saturated with hardenable material in a liquid or semi-liquid state to render it substantially impervious 22. A method as claimed in claim 6, in which earth bearing against a face of said part of the structure is porous, wherein air is evacuated from the porous earth in the vicinity of the structure by supplementary means, thereby by-passing the part of the structure being treated.

23. A method as claimed in claim 6, in which said part of the structure is at least partially submerged in water, wherein water is initially removed from within the substantially fluid-tight enclosure by at least one water pump and the enclosure is subsequently evacuated.

24. A method as claimed in claim 6, wherein the hardenable material is a material that, when it sets, will adhere strongly to surfaces of the structure.

25. A method as claimed in claim 6, wherein the hardenable material comprises a compound of which at least a major proportion is a synthetic resin.

26. A method as claimed in claim 25, wherein the synthetic resin is a polyester resin.

27. A method as claimed in claim 6, wherein the hardenable material is a cement/sand grout.

28. A method as claimed in claim 6, wherein the structure is fabricated by initially arranging the separately formed bodies of the structure or part of the structure in a desired configuration with spaces between.

29. A method of strengthening artificial and natural structures having voids therein by introducing a hardenable material in a liquid or semi-liquid state into said voids in the structure, at least some of which voids have openings in at least one surface of the structure, which method comprises surrounding at least a part of the structure containing the voids that are to be filled by a closely fitting, fluid-impermeable covering formed at least in part by applying to at least one exposed surface of the structure a continuous layer of hardenable material in a liquid or semi-liquid state; allowing said layer of hardenable material to set and form a closely fitting, fluid-impermeable coating; sealing boundary eges of the covering to the structure to form a substantially fluid-tight enclosure; evacuating air and any other fluid from the voids within the fluid-tight enclosure and, when the voids have been substantially evacuated, allowing the hardenable material in a liquid or semi-liquid state to enter into the evacuated voids until the hardenable material appears at said openings of voids in the surface or surfaces of the structure and allowing the hardenable material to set.

30. A method as claimed in claim 29, wherein the fluid-tight enclosure is formed in part by at least one closely fitting, flexible, fluid-impermeable shroud and in part by at least one closely fitting, fluid-impermeable coating.

31. A method as claimed in claim 29, wherein the hardenable material is of such a nature that when it is allowed to set it will form a coating that is substantially transparent.

* * * * *

REEXAMINATION CERTIFICATE (456th)

United States Patent [19]

Milne

[11] B1 4,060,953

[45] Certificate Issued  Feb. 11, 1986

[54] ARTIFICIAL AND NATURAL STRUCTURES

[75] Inventor: James Milne, Cumberland, England

[73] Assignee: Balfour, Beatty & Company Limited, Croydon, England

Reexamination Request:
No. 90/000,678, Dec. 3, 1984

Reexamination Certificate for:
Patent No.: 4,060,953
Issued: Dec. 6, 1977
Appl. No.: 411,038
Filed: Oct. 30, 1973

[30] Foreign Application Priority Data

Nov. 1, 1972 [GB] United Kingdom ............... 50321/72
Jul. 13, 1973 [GB] United Kingdom ............... 33559/73

[51] Int. Cl.⁴ ............................................. E02D 37/00
[52] U.S. Cl. ................... 52/743; 29/402.09; 29/402.18; 52/514; 264/36; 264/102; 425/85; 425/110; 425/117; 427/294; 427/297
[58] Field of Search ............. 264/36, 101, 102, 328.8, 264/328.13; 427/140, 294, 296, 297; 29/402.09, 402.18; 52/740, 743, 744; 425/85, 110, 117

[56] References Cited

U.S. PATENT DOCUMENTS 2,524,419 10/1950 Billner ................................. 25/1
2,671,158 3/1954 Rubenstein ........................ 52/309.1
2,913,036 11/1959 Smith ................................. 264/102

FOREIGN PATENT DOCUMENTS 1173380 7/1964 Fed. Rep. of Germany .

OTHER PUBLICATIONS

Stone: Properties, Durability in Man's Environment by E. M. Winkler, published by Springer, Voerlag, Veene, New York, 1973, pp. 190-193.

Primary Examiner—Henry E. Raduazo

[57] ABSTRACT

Voids in an artificial or natural structure are filled with a hardenable material in a liquid or semi-liquid state by surrounding the structure or a part of the structure containing the voids by a closely fitting, fluid-impermeable covering and sealing boundary edges of the covering to the structure to form a substantially fluid-tight enclosure. Air is evacuated from the voids within the fluid-tight enclosure and hardenable material in a liquid or semi-liquid state is allowed to enter into the evacuated voids until the hardenable material appears at the openings of the voids in the surface or surfaces of the structure. The hardenable material is then permitted or caused to set. The covering may be formed wholly or in part by at least one closely fitting, flexible, fluid-impermeable shroud, which is preferably transparent. At least part of the covering may comprise at least one closely fitting, fluid-impermeable coating.

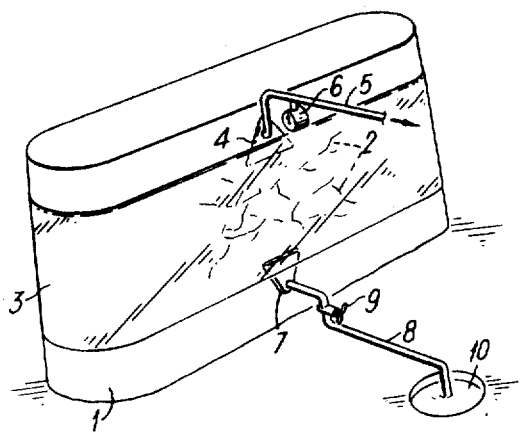

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1, line 43–Column 2, line 44:

[It is an object of the present invention to provide an improved method of introducing a hardenable material in a liquid or semi-liquid state into cracks or other voids in an artificial or natural structure of the kind specified which substantially reduces the risk that cracks or other voids within the interior of the structure will not be substantially filled with the hardenable material.

According to the invention the method comprises surrounding the structure or a part of the structure containing the cracks or other voids that are to be filled by a closely fitting, fluid-impermeable covering and sealing boundary edges of the covering to the structure to form a substantially fluid-tight enclosure, evacuating air and any other fluid from the cracks and other voids within the fluid-tight enclosure and, when the cracks and other voids have been substantially evacuated, allowing the hardenable material in a liquid or semi-liquid state to enter into the evacuated cracks or other voids until the hardenable material appears at the openings of the cracks and voids in the surface or surfaces of the structure, and permitting or causing the hardenable material to set.]

*It is an object of the present invention to provide an improved method of strengthening artificial and natural structures having voids therein by introducing a hardenable material in a liquid or semi-liquid state into said voids in the structure, at least some of which voids have openings in at least one surface of the structure.*

*According to the invention the method comprises surrounding at least a part of the structure containing the voids that are to be filled by a flexible, fluid-impermeable sheet of plastics material and sealing boundary edges of the plastics sheet to the structure by means separate and distinct from the plastics sheet to form a substantially fluid-tight enclosure; evacuating air and any other fluid from the voids within the fluid-tight enclosure and sucking the flexible plastics sheet towards the underlying surface or surfaces of the structure so that the flexible sheet is drawn against and closely fits said underlying surface or surfaces and, when the voids have been substantially evacuated, allowing the hardenable material in a liquid or semi-liquid state to enter into and to fill the evacuated voids until the hardenable material appears at said openings of voids in the surface or surfaces of the structure and allowing the hardenable material to set and adhere strongly to the boundary surfaces of the voids.*

[The closely fitting, fluid-impermeable covering may be formed wholly by a flexible shroud or, in some circumstances where the structure or part of the structure has a surface or surfaces of a shape or configuration that makes it difficult to envelop such surface or surfaces in a closely fitting shroud, for instance where a surface has a structural member or structural members upstanding from or projecting outwardly from the surface, the closely fitting, flexible, fluid-impermeable covering may be formed at least in part by applying to an exposed surface or exposed surfaces of the structure or part of the structure a continuous layer of hardenable material in a liquid or semi-liquid state which, on setting, forms a closely fitting, fluid-impermeable coating.]

[Where the closely fitting, fluid-impermeable covering consists of or comprises a flexible shroud, in] *In* order that progress of the filling operation can be observed at all times and that the supply of hardenable material can be cut off as soon as hardenable material appears at the openings of the cracks and voids in the surface or surfaces of the structure, the [shroud] *flexible plastics sheet* is preferably formed of a transparent material.

Boundary edges of the flexible [shroud] *plastics sheet* are preferably sealed to the structure by means of a coating of resin or other hardenable material, alternatively an adhesive tape may be employed, any tendency for leakage between the tape and the underlying part of the structure being substantially reduced automatically when the substantially fluid-tight enclosure is evacuated and the boundary edges of the [shroud] *flexible plastics sheet* are sucked down to the structure. Where a part of the external surface of a structure to which a boundary edge of a [shroud] *flexible plastics sheet* is to be sealed is very uneven or is of a porous nature, preferably the unevenness and/or porosity of that part of the surface is substantially reduced by application of a coating of cement or other suitable hardenable material in a liquid or semi-liquid state, the hardenable material being permitted or caused to set before the shroud is applied. If, despite continued evacuation of the enclosure, it is impossible to create a substantial vacuum within the [shroud] *flexible plastics sheet* thereby indicating that leakage is taking place at at least one location around the boundary edges of the shroud, a coating of hardenable material in a liquid or semi-liquid state may be applied over boundary edges of the [shroud] *flexible plastics sheet* and/or sealing tape while the enclosure is being evacuated, this coating being permitted or caused to set before hardenable material is caused to enter the cracks and other voids.

Column 2, line 53–Column 3, line 2:

The fluid-tight enclosure may be formed in part by at least one closely fitting, flexible, fluid-impermeable [shroud] *flexible plastics sheet* and in part by one or more than one closely fitting fluid-impermeable coating which is preferably substantially transparent, and in this case an outlet or outlets for connection to means for evacuating the enclosure will be provided in an upper part of the [shroud] *flexible plastics sheet*. [Where the fluid-tight enclosure is formed wholly by a closely fitting, fluid-impermeable coating, preferably at least one outlet to which means for evacuating the enclosure can be connected is connected to the cracks or other voids within the structure at an upper part of the structure before the layer of hardenable material is applied, the layer being permitted or caused to set before the cracks or other voids within the structure or part of the structure are evacuated and hardenable material in a liquid or semi-liquid state is caused to enter them.]

Column 4, line 52–Column 5, line 7:

Evacuation of the [closely fitting, fluid-impermeable covering] *fluid tight enclosure* is preferably effected by at least one vacuum pump and/or at least one air compressor and associated venturi suction ejector. Preferably the or each vacuum pump or air compressor and associated venturi suction ejector is connected to an outlet or outlets in an upper part of the [covering] *plastics sheet* and at least one source of hardenable material in a liquid or semi-liquid state is connected to an inlet or inlets at a lower part of the [covering] *plastics sheet* so that the hardenable material flows upwardly through the cracks or other voids in the structure or part of the structure surrounded by the substantially fluid-tight enclosure. In this case the or each vacuum pump or air compressor is maintained in operation until hardenable material appears at the or each outlet and has commenced to set. [Where the covering consists of or comprises a flexible shroud the source] *The* hardenable material in a liquid or semi-liquid state [will be] *preferably is* located at a position substantially below the lowermost boundary edge of the [shroud] *plastics sheet* to ensure that the shroud is sucked down on to the structure and to reduce the risk that the seal at the lowermost edge may be broken should flexing of a pipe extending between the or each inlet and the source occur.

Column 5, lines 22–34:

In the case of a structure that is substantially higher than the head of liquefied hardenable material that the vacuum pump or pumps or other means for evacuating air from the enclosure can support, such as for instance might be the case where the structure is a pier of a bridge, the structure may be treated in two or more sections located one above the other, the hardenable material introduced in one section being permitted or caused to set before work on the next section is carried out. Where a section of a structure to be treated is adjacent or extends below ground level, the lower boundary edge of the [shroud or coating] *plastics sheet* is preferably substantially sealed to the ground at or near the foot of the structure.

Column 5, line 62–Column 6, line 10:

The method of the present invention may also be employed in circumstances in which, by virtue of the fact that the cracks or voids that require filling with hardenable material are themselves wholly or partly sealed from the atmosphere, a specially applied closely fitting [covering] *plastics sheet* need not be arranged to overlie such voids, for instance, in cases where a crack or other void underlies a flexible membrane installed for other purposes, such as to act as a damp-proof barrier, or where cavities left during the construction of a concrete member have not been adequately grouted and remedial action is necessary. In such circumstances it may be necessary to drill two holes into the structure to interconnect with such voids, one for exhaust of air and one for injection of the hardenable material, or to drill one hole into the structure to interconnect with such voids to serve for either of these purposes.

Column 6, lines 37–54:

Referring to FIGS. 1 and 2, in a first method of restoring the brick work of a bridge pier 1 that has become badly cracked and crumbly, the cracked and crumbly portion of the pier is first flushed with water under pressure to remove dust, dirt and other loose particles from the cracks 2 and the cracked portion of the pier is then enveloped in a [shroud] *sheet* 3 of transparent polythene, the edges of the [shroud] *sheet* being sealed to the pier by resin or other adhesive. Attached to and projecting from an upper part of the [shroud] *sheet* 3 is an outlet fitting 4 to which is attached a pipe 5, for connection to a vacuum pump or air compressor/venturi arrangement (not shown). A vacuum gauge 6 is connected in the pipe 5 a short distance from the outlet fitting 4. An inlet fitting 7 is attached to and projects outwardly from a lower part of the [shroud] *sheet* 3 and this fitting is connected to a source 10 of liquefied grout by a pipe 8. A tap 9 is provided in the pipe 8.

Column 7, lines 37–51:

The bridge pier 11 shown in FIG. 3 has cracks 12 in its brickwork which open into both the uppermost surface and side faces of the pier and has upstanding from this uppermost surface structural members 13. The structural members 13 make it difficult to envelop the upper surface in a flexible [shroud] *plastics sheet*. In the method of restoring this pier a coating 14 of synthetic resin is sprayed or painted over the whole of the upper surface of the pier to seal the cracks 12 opening into that surface. After the coating 14 has set a shroud 15 is applied about the pier with the upper edge of the [shroud] *plastics sheet* adjacent the upper edge of the pier, the edges of the [shroud] *plastics sheet* are sealed to the surfaces of the pier, and the brickwork is then restored by the method as described with reference to FIGS. 1 and 2.

Column 7, line 58–Column 8, line 32:

In fabricating a brick wall 31 by the method as illustrated in FIG. 4, the wall is built up from a plurality of bricks with the bricks spaced an appropriate distance apart by means of separately formed spacers (not shown) interposed between adjacent bricks or by means of spacers (not shown) integral with the bricks themselves. The dry brick wall 31 so formed is completely enveloped in a [shroud] *sheet* 32 of transparent polythene, the lowermost edge of the [shroud] *sheet* being sealed to the ground by applying hardenable material 33 over the edge of the [shroud] *sheet* the hardenable material on setting bonding to the ground. In the upper part of the [shroud] *sheet* 32 is an outlet fitting 34 to which is connected a pipe 35 for connection to a vacuum pump or air compressor/venturi arrangement (not shown), a vacuum gauge 36 and a valve 37 being connected in the pipe. At a lower portion of the [shroud] *sheet* 32 at one end of the wall an inlet fitting 38 is connected to a well 41 by a pipe 39, a tap 40 being provided in the pipe.

After the hardenable material 33 has set to seal the shroud 32 to the ground, the tap 40 is closed and the vacuum pump or air compressor/venturi arrangement is brought into operation to evacuate the substantially fluid-tight enclosure formed by the [shroud] *sheet* and to withdraw air from the spaces between the bricks. After the vacuum gauge 36 indicates an appropriate suction head, say greater than 26 feet of water, the tap 40 is opened and polyester resin in a liquefied state is drawn through the pipe 39 into the fluid-tight enclosure to fill the spaces between the bricks. When the level of polyester resin is observed through the transparent polythene [shroud] *sheet* 32 to have reached the outlet fitting 34, the tap 40 is closed. Full suction head is maintained for three or four minutes and is then gradually reduced when it is observed that hardening of the resin has started to occur. The vacuum pump or air compressor may be shut off after gelation has occurred, normally after 25 to 30 minutes. The polythene sheet is then removed. The spaces between the bricks are now completely filled with hardened polyester resin which is bonded securely to the faces of the bricks bounding the spaces, cracks, fissures and porous areas in the bricks themselves are also completely filled with hardened polyester resin.

Column 8, line 67–Column 9, line 55:

FIG. 5 shows a fragmental sectional view of an archaeological ruin 51 built up of a plurality of preformed stone blocks 52. In repairing a portion of the ruin, stone blocks that have broken into two or more parts or that have become badly cracked are removed from the ruin and are replaced by new stone blocks 52 that are arranged with spaces between them by means of appropriate spacers (not shown). As the new blocks 52 are assembled a length of wire 53 is arranged to extend sinuously through some of the spaces between the blocks with the ends of the wire projecting from a surface of the ruin. The renovated portion of the ruin is now enclosed in a shroud 54 with the ends of the wire 53 protruding through fluid-tight seals 55 in the [shroud] *plastics sheet* and the edges of the [shroud] *sheet* are sealed to the ruin by resin or other adhesive. The protruding ends of the wire 53 are connected through a switch 56 to a source of electrical power (not shown). The substantially fluid-tight enclosure formed by the [shroud] *sheet* 54 is now evacuated, as in the method described with reference to FIGS. 1 and 2 and, when the required degree of vacuum has been obtained, grout 57 is drawn into the enclosure to fill the spaces between the blocks 52. After impregnation is complete, the switch 56 is closed to cause an electric current to flow through the wire 53 sufficient to heat the grout in which it is embedded and expedite setting of the grout. When the grout 57 has set the [shroud 54] *flexible plastics sheet* and associated equipment are removed and the protruding ends of the wire 53 are cut flush with the surface of the ruin. The length of wire 53 embedded in the hardened grout 57 serves to reinforce the renovated part of the ruin.

The adaptors shown in FIGS. 6 and 7 may each be used as an inlet fitting of a [shroud] *flexible plastics sheet*. The adaptor shown in FIG. 6 comprises an inverted saucer-shaped body 61 of plastics material having a short tubular neck 62 which may be passed through a hole in the [shroud] *sheet* 63 for connection to a pipe, the edges of the adaptor being sealed to the [shroud] *sheet* by adhesive tape or other suitable means.

The adaptor shown in FIG. 7 is designed for use when it is desired to provide an inlet fitting at a position on a [shroud] *flexible plastics sheet* overlying a part of a structure where there may be voids in the structure so remote that they may not become fully filled with hardenable material. The adaptor is of similar form to that shown in FIG. 6 except that it has a soft rubber ring 75 of U-shaped cross-section extending around the periphery of the inverted saucer-shaped body 71 and has, secured to the radially inner edge of the ring, a cutter 76. When the adaptor is to be used it is placed over a part of the shroud 73 where an inlet fitting is required and is rotated to a sufficient extent to cause the cutter 76 to puncture the [shroud] *sheet*. The vacuum existing within the [shroud] *sheet* holds the adaptor against the punctured part of the [shroud] *sheet* with the ring 75 making an effective fluid-tight seal and the adaptor may then be connected by a pipe to a source of liquefied hardenable material.

AS A RESULT OF REEXAMINATION, IT HAS BEEN DETERMINED THAT:

Claims 6, 12, 24 and 29–31 are cancelled.

Claims 1–5, 7–11, 13–17, 19–23, 25, 27 and 28 are determined to be patentable as amended.

Claims 18 and 26, dependent on an amended claim, are determined to be patentable.

1. A method of strengthening artificial and natural structures having voids therein by introducing a hardenable material in a liquid or semi-liquid state into said voids in the structure, at least some of which voids have openings in at least one surface of the structure, which method comprises surrounding at least a part of the structure containing the voids that are to be filled by a [closely fitting,] flexible, fluid-impermeable [shroud] *sheet of plastics material* and sealing boundary edges of the [shroud] *sheet* to the structure *by means separate and distinct from the plastics sheet* to form a substantially fluid-tight enclosure; evacuating air and any other fluid from the voids within the fluid-tight enclosure *and sucking the flexible sheet towards the underlying surface or surfaces of the structure so that the flexible sheet is drawn in against and closely fits said underlying surface or surfaces* and, when the voids have been substantially evacuated, allowing the hardenable material in a liquid or semi-liquid state to enter into *and to fill* the evacuated voids until the hardenable material appears at said openings of voids in the surface or surfaces of the structure and allowing the hardenable material to set *and adhere strongly to the boundary surfaces of the voids.*

2. A method as claimed in claim 1, wherein the [shroud] *plastics sheet* is removed after the hardenable material has set.

3. A method as claimed in claim 1, wherein the [shroud] *plastics sheet* is of a transparent material.

4. A method as claimed in claim 1, wherein a coating of hardenable material is applied over boundary edges of the flexible [shroud] *plastics sheet* to seal them to the structure.

5. A method [as claimed in claim 1,] *of strengthening artificial and natural structures having voids therein by introducing a hardenable material in a liquid or semi-liquid state into said voids in the structure, at least some of which voids have openings in at least one surface of the structure and* in which a part of the external surface of a structure to which a boundary edge of [the shroud] *a plastics sheet* is to be sealed is uneven or is of a porous nature, which *method comprises the steps of* [wherein] *applying* a coating of hardenable material in a liquid or semi-liquid state [is applied] to said part of the external surface and [is allowed] *allowing said coating* to set before [the shroud] *said plastics sheet* is applied, *thereafter surrounding at least a part of the structure containing the voids that are to be filled by a separate closely fitting,* flexible, fluid-impermeable plastics sheet and sealing boundary edges of the plastics sheet to the structure including the previously set hardenable coating to form a substantially fluid-tight enclosure; evacuating air and any other fluid from the voids within the fluid-tight enclosure and sucking the flexible plastics sheet towards the underlying surface or surfaces of the structure so that the flexible plastics sheet is drawn against said underlying surface or surfaces and, when the voids have been substantially evacuated, allowing the hardenable material in a liquid or semi-liquid state to enter into and to fill the evacuated voids until the hardenable material appears at said openings of voids in the surface or surfaces of the structure and allowing the hardenable material to set and adhere strongly to the boundary surfaces of the voids.

7. A method as claimed in claim [6] 1, in which groups of voids that have openings in a surface of the structure are isolated one group from another, wherein depressions are cut in the surface of the structure to interconnect all said openings.

8. A method as claimed in claim [6] 1, wherein at least one outlet for connection to means for evacuating the enclosure is provided in an upper part of the [covering] plastics sheet and at least one inlet for connection to a source of hardenable material in a liquid or semi-liquid state is provided in a lower part of the [covering] plastics sheet.

9. A method as claimed in claim [6] 1, in which the part of the structure surrounded by the substantially fluid-tight enclosure contains moisture, wherein evacuation of the voids in the structure is effected to such an extent and for such a time that said part of the structure is substantially dehydrated before hardenable material is caused to enter the voids.

10. A method as claimed in claim [6] 1, wherein loose particles that may be present in the voids are flushed out with fluid under pressure before the voids are evacuated and evacuation of the voids in the structure is effected to such an extent and for a such a time that said part of the structure surrounded by the substantially fluid-tight enclosure is substantially dehydrated before hardenable material is caused to enter the voids.

11. A method as claimed in claim [6] 1, in which the hardenable material employed is a material which will set more rapidly when heated, wherein at least one electrically continuous elongate electric conductor is arranged in at least some of the voids in said part of the structure before the substantially fluid-tight enclosure is formed, the ends of the conductor being arranged to protrude through fluid-tight seals in the walls of the enclosure for connection to a source of electrical supply and, after the hardenable material has entered the evacuated voids, an electric current is caused to flow through the or each conductor sufficient to heat the conductor and the hardenable material in which it is embedded and thereby assist in setting of the hardenable material.

13. A method as claimed in claim [12] 1, wherein the substantially fluid-tight enclosure is initially partially evacuated by at least one air compressor and is subsequently substantially wholly evacuated by at least one vacuum pump.

14. A method as claimed in claim [6] 1, in which part of the structure is substantially higher than a head of liquefied hardenable material that the means for evacuating air from a substantially fluid-tight enclosure can support, wherein said part of the structure is treated in at least two sections located one above the other, the hardenable material introduced into one section being allowed to set before work on the next section is carried out.

15. A method as claimed in claim [6] 1, wherein, whilst hardenable material is being drawn into the substantially fluid-tight enclosure, the enclosure is subjected to a pulsating vacuum.

16. A method [as claimed in claim 6] of strengthening artificial and natural structures having voids therein by introducing a hardenable material in a liquid or semi-liquid state into said voids in the structure, at least some of which voids have openings in at least one surface of the structure, which method comprises surrounding at least a part of the structure containing the voids that are to be filled by a closely fitting, flexible, fluid-impermeable shroud and sealing boundary edges of the shroud to the structure to form a substantially fluid-tight enclosure; evacuating air and any other fluid from the voids within the fluid-tight enclosure and sucking the flexible shroud towards the underlying surface or surfaces of the structure so that the flexible shroud is drawn against said underlying surface or surfaces and, when the voids have been substantially evacuated, allowing the hardenable material in a liquid or semi-liquid state to enter into and to fill the evacuated voids until the hardenable material appears at said openings of voids in the surface or surfaces of the structure and allowing the hardenable material to set and adhere strongly to the boundary surfaces of the voids and wherein, whilst hardenable material is being drawn into the substantially fluid-tight enclosure, the degree of vacuum is maintained as low as possible until all voids are substantially filled with hardenable material, the degree of vacuum is then raised to a level sufficient to remove any air bubbles and, on completion of the filling process, the degree of vacuum is reduced to an extent sufficient to prevent escape of hardenable material before it starts to set.

17. A method as claimed in claim [6] 1, in which a void in said part of the structure is at least partly sealed within the structure from the atmosphere, wherein at least one hole is formed in the structure to connect the void to the atmosphere.

19. A method as claimed in claim [6] 1, in which voids in said part of the structure are at least partly sealed within the structure from the atmosphere, wherein at least one hole is formed in the structure to interconnect said voids and connect them to the atmosphere.

20. A method [as claimed in claim 6,] of strengthening artificial and natural structures having voids therein by introducing a hardenable material in a liquid or semi-liquid state into said voids in the structure, at least some of which voids have openings in at least one surface of the structure, which method comprises surrounding at least a part of the structure containing the voids that are to be filled by a closely fitting, flexible, fluid-permeable shroud and sealing boundary edges of the shroud to the structure to form a substantially fluid-tight enclosure; evacuating air and any other fluid from the voids within the fluid-tight enclosure and sucking the flexible shroud towards the underlying surface or surfaces of the structure so that the flexible shroud is drawn against said underlying surface or surfaces and, when the voids have been substantially evacuated, allowing the hardenable material in a liquid or semi-liquid state to enter into and to fill the evacuated voids until the hardenable material appears at said openings of voids in the surface or surfaces of the structure and allowing the

*hardenable material to set and adhere strongly to the boundary surfaces of the voids and* in which earth bearing against a face of said part of the structure is porous, wherein said porous earth is saturated with hardenable material in a liquid or semi-liquid state to render it substantially impervious.

21. A method [as claimed in claim 6,] *of strengthening artificial and natural structures having voids thereby introducing a hardenable material in a liquid or semi-liquid state into said voids in the structure, at least some of which voids have openings in at least one surface of the structure, which method comprises surrounding at least a part of the structure containing the voids that are to be filled by a closely fitting, flexible, fluid-impermeable shroud and sealing boundary edges of the shroud to the structure to form a substantially fluid-tight enclosure; evacuating air and any other fluid from the voids within the fluid-tight enclosure and sucking the flexible shroud towards the underlying surface or surfaces of the structure so that the flexible shroud is drawn against said underlying surface or surfaces and, when the voids have been substantially evacuated, allowing the hardenable material in a liquid or semi-liquid state to enter into and to fill the evacuated voids until the hardenable material appears at said openings of voids in the surface or surfaces of the structure and allowing the hardenable material to set and adhere strongly to the boundary surfaces of the voids and* in which the structure is supported on the ground and ground in the vicinity of that part of the structure in contact with the ground is porous, wherein said porous ground is saturated with hardenable material in a liquid or semi-liquid state to render it substantially impervious.

22. A method [as claimed in claim 6,] *of strengthening artificial and natural structures having voids whereby introducing a hardenable material in a liquid or semi-liquid state into said voids in the structure, at least some of which voids having openings in at least one surface of the structure, which method comprises surrounding at least a part of the structure containing the voids that are to be filled by a closely fitting, flexible, fluid-impermeable shroud and sealing boundary edges of the shroud to the structure to form a substantially fluid-tight enclosure; evacuating air and any other fluid from the voids within the fluid-tight enclosure and sucking the flexible shroud towards the underlying surface or surfaces of the structure so that the flexible shroud is drawn against said underlying surface or surfaces and, when the voids have been substantially evacuated, allowing the hardenable material in a liquid or semi-liquid state to enter into and to fill the evacuated voids until the hardenable material appears at said openings of voids in the surface or surfaces of the structure and allowing the hardenable material to set and adhere strongly to the boundary surfaces of the voids and* in which earth bearing against a face of said part of the structure is porous, wherein air is evacuated from the porous earth in the vicinity of the structure by supplementary means, thereby by-passing the part of the structure being treated.

23. A method as claimed in claim [6] *1*, in which said part of the structure is at least partially submerged in water, wherein water is initially removed from within the substantially fluid-tight enclosure by at least one water pump and the enclosure is subsequently evacuated.

25. A method as claimed in claim [6] *1*, wherein the hardenable material comprises a compound of which at least a major proportion is a synthetic resin.

27. A method as claimed in claim [6] *1*, wherein the hardenable material is a cement/sand grout.

28. A method as claimed in claim [6] *1*, wherein the structure is fabricated by initially arranging the separately formed bodies of the structure or part of the structure in a desired configuration with spaces between.

* * * * *